(12) United States Patent
Zeder

(10) Patent No.: US 10,226,146 B1
(45) Date of Patent: Mar. 12, 2019

(54) ELECTRIC COOKING SYSTEM AND A COOKING METHOD USING THE SAME

(71) Applicant: Smartstr Inc., New York, NY (US)

(72) Inventor: Roland Zeder, New York, NY (US)

(73) Assignee: Smartstr Inc., New York, NY (US)

( * ) Notice: Subject to any disclaimer, the term of this patent is extended or adjusted under 35 U.S.C. 154(b) by 0 days.

(21) Appl. No.: 14/827,500

(22) Filed: Aug. 17, 2015

Related U.S. Application Data

(60) Provisional application No. 62/053,176, filed on Sep. 21, 2014.

(51) Int. Cl.
| | |
|---|---|
| *A47C 27/00* | (2006.01) |
| *H05B 3/68* | (2006.01) |
| *H05B 3/06* | (2006.01) |
| *A47J 27/00* | (2006.01) |
| *A23L 1/01* | (2006.01) |

(52) U.S. Cl.
CPC .......... *A47J 27/004* (2013.01); *A23L 1/0121* (2013.01); *H05B 3/06* (2013.01); *H05B 3/68* (2013.01)

(58) Field of Classification Search
CPC ........ A47J 27/004; A23L 1/0121; H05B 3/06; H05B 3/68
USPC ................. 99/275, 280, 323, 330, 331, 332; 426/231, 115, 394, 433, 16, 523, 11, 405, 426/44, 466, 549, 87; 219/401, 502
See application file for complete search history.

(56) References Cited

U.S. PATENT DOCUMENTS

| | | | |
|---|---|---|---|
| 4,913,038 A | | 4/1990 | Burkett et al. |
| 5,031,519 A | * | 7/1991 | Toida .................... A47J 27/002 126/369 |
| 5,092,229 A | | 3/1992 | Chen |
| 5,352,866 A | | 10/1994 | Cartwright et al. |
| 5,458,050 A | * | 10/1995 | Su ........................ A23B 7/0205 219/386 |
| 5,567,458 A | * | 10/1996 | Wu ........................ A47J 27/004 219/433 |
| 6,102,238 A | | 8/2000 | Brady et al. |

(Continued)

OTHER PUBLICATIONS

Crock-Pot 0.6L Rice Cooker Grey Webpage, Amazon.co.uk Website, Web page <http://www.amazon.co.uk/Crock-Pot-0-6L-Rice-Cooker-Grey/dp/B007XEJ55M>, 5 pages, dated Feb. 14, 2013, retrieved from Internet Archive Wayback Machine https://web.archive.org/web/20130214081150/http://www.amazon.co.uk/Crock-Pot-0-6L-Rice-Cooker-Grey/dp/B007XEJ55M> on Oct. 4, 2016.

(Continued)

*Primary Examiner* — Tu B Hoang
*Assistant Examiner* — Vy T Nguyen
(74) *Attorney, Agent, or Firm* — The Law Office of Patrick F. O'Reilly III, LLC

(57) ABSTRACT

An electric cooking device includes a food holding portion, the food holding portion configured to receive a food product for cooking; an electric heating device thermally coupled to the food holding portion, the electric heating device configured to heat the food product disposed in the food holding portion; and a control unit operatively coupled to the electric heating device, the control unit configured to control the electric heating device such that the food product is heated for a predetermined amount of time. An electric cooking system includes the electric cooking device and a smart digital device operatively coupled to the electric cooking device.

17 Claims, 13 Drawing Sheets

(56) References Cited

U.S. PATENT DOCUMENTS

| | | | |
|---|---|---|---|
| 6,516,709 B1 * | 2/2003 | Lin | A47J 27/004 126/369 |
| 6,587,739 B1 | 7/2003 | Abrams et al. | |
| 6,850,149 B2 | 2/2005 | Park | |
| D517,856 S | 3/2006 | Krasne | |
| D566,457 S | 4/2008 | Ryan | |
| D577,247 S | 9/2008 | Barnes et al. | |
| 7,421,941 B2 | 9/2008 | Kim | |
| 7,706,671 B2 | 4/2010 | Brown | |
| 8,688,277 B2 | 4/2014 | Studor et al. | |
| 2004/0079747 A1 | 4/2004 | Wang | |
| 2008/0035644 A1 * | 2/2008 | Dahlquist | A47G 19/02 220/501 |
| 2008/0102190 A1 | 5/2008 | Trow | |
| 2008/0108388 A1 | 5/2008 | Ebrom et al. | |
| 2010/0089246 A1 * | 4/2010 | Yang | A47J 37/1209 99/403 |
| 2011/0126719 A1 * | 6/2011 | Valance | A47J 43/0722 99/340 |
| 2011/0185915 A1 * | 8/2011 | Eades | A47J 27/004 99/331 |
| 2012/0006206 A1 | 1/2012 | Trow | |
| 2013/0112683 A1 * | 5/2013 | Hegedis | A47J 27/62 219/660 |
| 2013/0196038 A1 | 8/2013 | Liu | |
| 2013/0202760 A1 | 8/2013 | Holcomb et al. | |
| 2016/0198883 A1 * | 7/2016 | Wang | A47J 27/08 426/231 |

OTHER PUBLICATIONS

Zojirushi Neuro Fuzzy® Rice Cooker & Warmer Webpage, Zojirushi Website, Web page <http://www.zojirushi.com/products/nszcc>, 2 pages, dated Mar. 17, 2013, retrieved from Internet Archive Wayback Machine <https://web.archive.org/web/20130317083603/http://www.zojirushi.com/products/nszcc> on Oct. 4, 2016.

* cited by examiner

ELECTRIC COOKING SYSTEM AND A COOKING METHOD USING THE SAME

CROSS-REFERENCE TO RELATED APPLICATIONS

This patent application claims priority to, and incorporates by reference in its entirety, U.S. Provisional Patent Application No. 62/053,176, entitled "Electric Cooking System And A Cooking Method Using The Same", filed on Sep. 21, 2014.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to an electric cooking system and a cooking method using the same. More particularly, the invention relates to an electric cooking system that is configured to cook a food product at a simmer temperature.

2. Background

More than half of all breakfast eaters in the United States choose to eat oatmeal. Most consumers currently choose rolled oats because it is the quickest and most convenient way to prepare oatmeal. Rolled oats go through a steaming, rolling, and toasting process before they reach the consumer. In comparison, steel cut oats are simply whole grains cut into smaller pieces. The main health benefits over rolled oats are (12%) fewer calories and a lower Glycemic Index value. Many consumers also prefer the texture and taste of oatmeal (i.e., porridge) made from steel cut oats. However, preparing a portion of steel cut oatmeal can take over half an hour and frequent stirring is required to prevent burning and the forming of a starch-based un-appetizing skin. There are also pots and cooking utensils to clean afterwards. The busy lifestyle of most consumers does not allow for such a time investment and most choose to compromise, and use rolled oats.

Some consumers opt to use a basic rice cooker to prepare steel cut oatmeal. However, these devices are designed to boil the contents and turn to a lower heat setting once the water has been absorbed or evaporated. Tests have shown that vigorous boiling of the steel cut oat releases starch, which leads to substantial foaming and occasional over-boiling of the oat-water slurry. In addition, this starch leads to the forming of an un-appetizing 'skin' on top of the oatmeal and along the surface of the cooking vessel. The consumer's attention is still required to monitor the progress and to turn off the unit once the oatmeal is ready to prevent over-cooking and toasting. There is little cooking time benefit over stove-top cooking.

Some consumers opt to use an electric slow cooker. Such a device may yield satisfactory results but time and temperature settings have to be established by the user, generally through trial-and-error. These devices are designed to allow for a multitude of cooking options, which requires a complex user interface and makes the machine larger and costlier than it needs to be for cooking steel cut oats.

Therefore, what is needed is an electric cooking device that is capable of efficiently heating a food product at a simmer temperature without requiring laborious cooking tasks to be performed by a user thereof. Moreover, an electric cooking system, which includes an electric cooking device, is needed that is capable of using a user interface of a separate, external electronic device for adjusting the cooking settings of the electric cooking device so as to obviate the need for a complex user interface on the electric cooking device itself. Furthermore, there is a need for a method, which utilizes the electric cooking system, for the controlled cooking of grains at a simmer temperature without the undesirable formation of a skin on the cooked grains.

BRIEF SUMMARY OF EMBODIMENTS OF THE INVENTION

Accordingly, the present invention is directed to an electric cooking system and a cooking method using the same that substantially obviates one or more problems resulting from the limitations and deficiencies of the related art.

In accordance with one or more embodiments of the present invention, there is provided an electric cooking device that includes a food holding portion, the food holding portion configured to receive a food product for cooking; an electric heating device thermally coupled to the food holding portion, the electric heating device configured to heat the food product disposed in the food holding portion; and a control unit operatively coupled to the electric heating device, the control unit configured to control the electric heating device such that the food product is heated at a sub-boil simmer temperature for a predetermined amount of time.

In a further embodiment of the present invention, the control unit comprises an electronic controller configured to execute a range of time and temperature parameters for cooking the food product and to process communications with a user of the cooking device.

In yet a further embodiment, the electric cooking device further comprises a temperature sensor configured to detect a temperature of the food holding portion proximate to the food product during the heating thereof, the temperature sensor being operatively coupled to the electronic controller; and wherein the electronic controller is further configured to manage a power supply of the electric cooking device, monitor the temperature of the food holding portion by means of the temperature sensor, and monitor cooking time by means of an internal clock.

In still a further embodiment, the control unit further comprises one of: (i) a proportional-integral (PI) controller, (ii) a proportional-derivative (PD) controller, and (iii) a proportional-integral-derivative (PID) controller, the control unit configured to provide a control loop feedback mechanism for the monitoring of the temperature and the monitoring of the cooking time.

In yet a further embodiment, the electric cooking device further comprises a heat shield member, the heat shield member configured to protect one or more electronic components of the control unit from the heat generated by the electric heating device.

In still a further embodiment, the electric cooking device further comprises an eating dish integrated into the electric cooking device, the eating dish being coupled to one or more other components of the electric cooking device.

In yet a further embodiment, the food holding portion comprises a cooking bowl assembly, the eating dish configured to engage with the cooking bowl assembly.

In still a further embodiment, the cooking bowl assembly comprises a cooking bowl body portion, a cooking bowl lid, and a handle subassembly, the cooking bowl body portion configured to engage with the handle subassembly.

In yet a further embodiment, the handle subassembly comprises a thermally insulated handle ring portion, the cooking bowl body portion configured to toollessly engage the thermally insulated handle ring portion.

In still a further embodiment, the cooking bowl assembly comprises a cooking bowl body portion, a cooking bowl lid, and a handle subassembly, the cooking bowl body portion configured to engage with the handle subassembly, and the handle subassembly comprises a thermally insulated handle ring portion, the cooking bowl body portion configured to toollessly engage the thermally insulated handle ring portion.

In yet a further embodiment, the electric cooking device further comprises an outer shell portion that is configured to be assembled to one or more other components of the electric cooking device by means of clamping without a use of fastener devices.

In still a further embodiment, the electric cooking device further comprises one or more light emitting devices configured to provide a visual indicator to the user indicative of one or more operational states of the electric cooking device.

In yet a further embodiment, the one or more light emitting devices comprise one or more light-emitting diodes (LEDs).

In still a further embodiment, the one or more light emitting devices are capable of a plurality of different states of illumination, the plurality of different states of illumination including at least one of: (i) blinking, (ii) pulsing, (iii) continuous activation or deactivation, and (iv) a change in illumination color.

In yet a further embodiment, the electric cooking device does not comprise a pressure cooking device.

In still a further embodiment, the electric cooking device does not comprise any moving components that contact the food product.

In yet a further embodiment, the electric cooking device does not comprise a pressure cooking device, and the electric cooking device does not comprise any moving components that contact the food product.

In accordance with one or more other embodiments of the present invention, there is provided an electric cooking system that includes an electric cooking device and a smart digital device. The electric cooking device includes a food holding portion, the food holding portion configured to receive a food product for cooking; an electric heating device thermally coupled to the food holding portion, the electric heating device configured to heat the food product disposed in the food holding portion; and a control unit operatively coupled to the electric heating device, the control unit configured to control the electric heating device such that the food product is heated at a sub-boil simmer temperature for a predetermined amount of time. In these one or more embodiments, the electric cooking device does not include a visual display device for displaying cooking settings to a user. The smart digital device is operatively coupled to the control unit of the electric cooking device, and the smart digital device is specially programmed to allow the user to adjust the cooking settings of the electric cooking device.

In a further embodiment of the present invention, the electric cooking device further comprises a wireless data interface for wirelessly communicating with the smart digital device.

In yet a further embodiment, the wireless data interface of the electric cooking device is configured to wirelessly communicate with the smart digital device by means of a wireless personal area network.

In still a further embodiment, the smart digital device comprises one of: (i) a cellular phone, (ii) a tablet device, (iii) a laptop computing device, (iv) a palmtop computing device, and (v) a desktop computing device.

In yet a further embodiment, the smart digital device comprises a touchscreen user interface, and the smart digital device is specially programmed so as to enable the user to adjust the cooking settings of the electric cooking device using the touchscreen user interface.

In still a further embodiment, the electric cooking device comprises a single user interface button on an outside thereof, the single user interface button only enabling basic user interactions, which include initiating an execution of a last-used time and/or temperature parameter and termination of an active cooking setting.

In yet a further embodiment, the electric cooking device does not utilize a plurality of networked computers in order to communicate with the smart digital device.

In accordance with yet one or more other embodiments of the present invention, there is provided a method for controlled cooking of grains, the method comprising the steps of: (i) providing an electric cooking device; (ii) placing a predetermined amount of grains into the food holding portion of the electric cooking device; (iii) placing a predetermined amount of water into the food holding portion of the electric cooking device, the predetermined amount of water being proportional to the predetermined amount of grains; and (iv) cooking the predetermined amount of grains at a simmer temperature for a predetermined amount of time without reaching a boiling point temperature for an extended period of time. The electric cooking device includes a food holding portion, the food holding portion configured to receive a food product for cooking; an electric heating device thermally coupled to the food holding portion, the electric heating device configured to heat the food product disposed in the food holding portion; and a control unit operatively coupled to the electric heating device, the control unit configured to control the electric heating device such that the food product is heated at a sub-boil simmer temperature for a predetermined amount of time.

In a further embodiment of the present invention, the predetermined amount of grains comprises a predetermined amount of steel cut oats.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
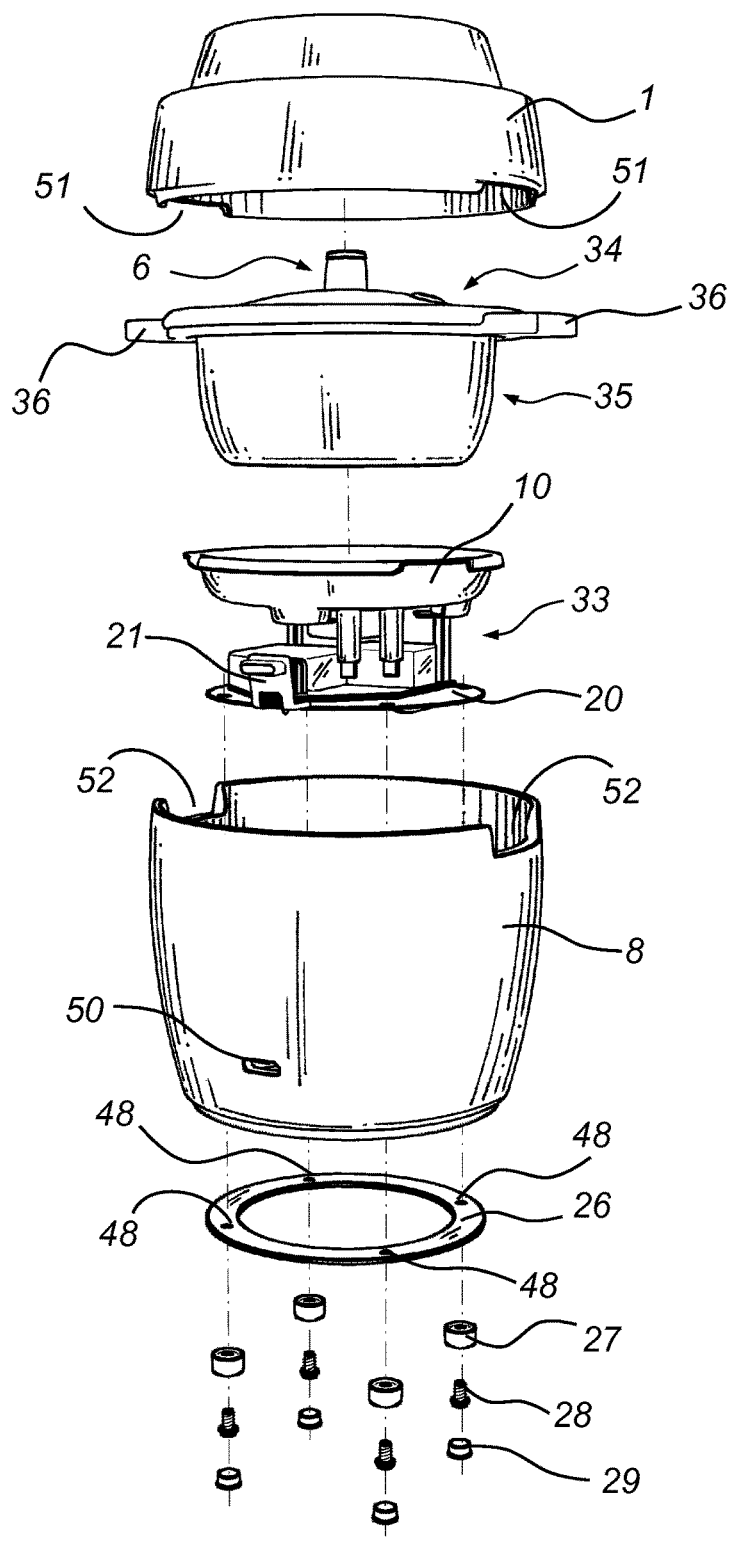
FIG. 1 is an exploded perspective view of an electric cooking device, according to an embodiment of the invention.

In one or more embodiments, an electric cooking system is disclosed that caters to the needs of a busy lifestyle. An important part of the functionality of the electric cooking system in these one or more embodiments is based on the discovery that cooking grain at a sub-boil simmer temperature will yield skin-free, appetizing results. In these one or more embodiments, the electric cooking device of the electric cooking system is programmed to bring the water/grain slurry to a pre-set ideal simmer temperature, and then hold that temperature for a pre-programmed amount of time before reducing the temperature and then turning itself off. As such, in these one or more embodiments, the only user interactions are the filling of the device with water and steel cut oats, and the setting of the amount and time of the day when the user wants the meal to be ready. In the case of a cereal breakfast for example, the user fills and activates the device the evening before. The setting may be done through an intuitive and simple smart device application user interface. That is, in these one or more embodiments, the smart device, such as an iPhone® or iPad®, simply connects to the cooking device through built-in Bluetooth® LE. Thus, a Wi-Fi™ network is not required.

An illustrative embodiment of an electric cooking device is seen generally at 100 in FIGS. 1-12. Referring initially to the exploded views of FIGS. 1 and 2, it can be seen that the illustrative electric cooking device 100 generally comprises a food holding portion (e.g., cooking bowl assembly 35), the food holding portion 35 configured to receive a food product for cooking; an electric heating device 9 thermally coupled to the food holding portion 35, the electric heating device 9 configured to heat the food product disposed in the food holding portion 35; and a control unit (e.g., printed circuit board 13 and integrated circuit microchip 14) operatively coupled to the electric heating device 9, the control unit 13, 14 configured to control the electric heating device 9 such that the food product is heated at a substantially constant sub-boil simmer temperature (i.e., a temperature below 212° F.) for a predetermined amount of time (e.g., the cooking times discussed in conjunction with the exemplary method for cooking steel cut oats discussed below). In one or more embodiments, when the device 100 is first activated, the heating temperature consistently increases until it reaches the substantially constant sub-boil simmer temperature, and then towards the end of the cooking cycle, the heating temperature drifts downward from the substantially constant sub-boil simmer temperature for a final period of time (e.g., for 10 minutes or another suitable time duration).

Figure 3:
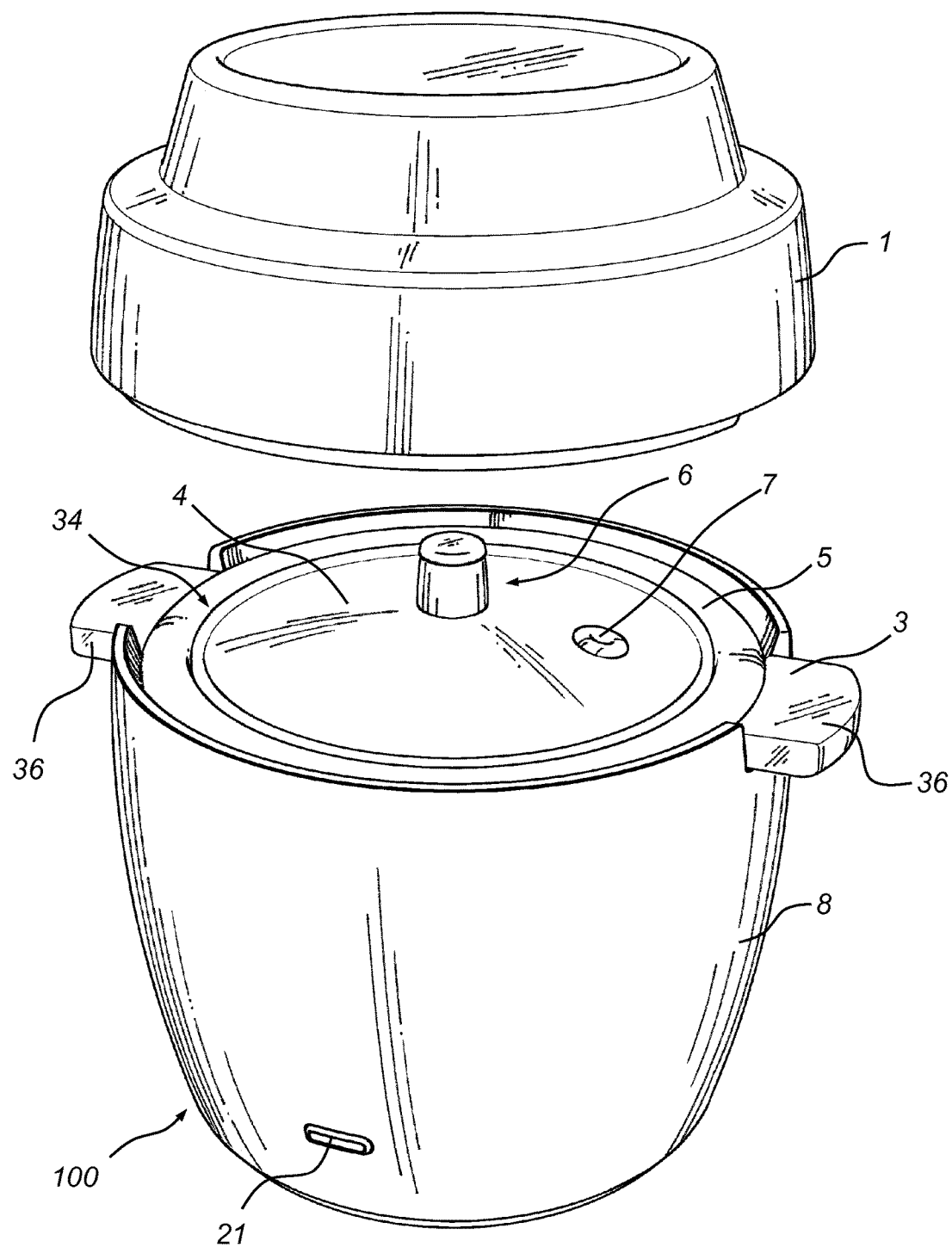
FIG. 3 is a partially exploded perspective view of the electric cooking device of FIG. 1, wherein an eating dish of the electric cooking device is shown exploded from the remainder of the electric cooking device.
Figure 5:
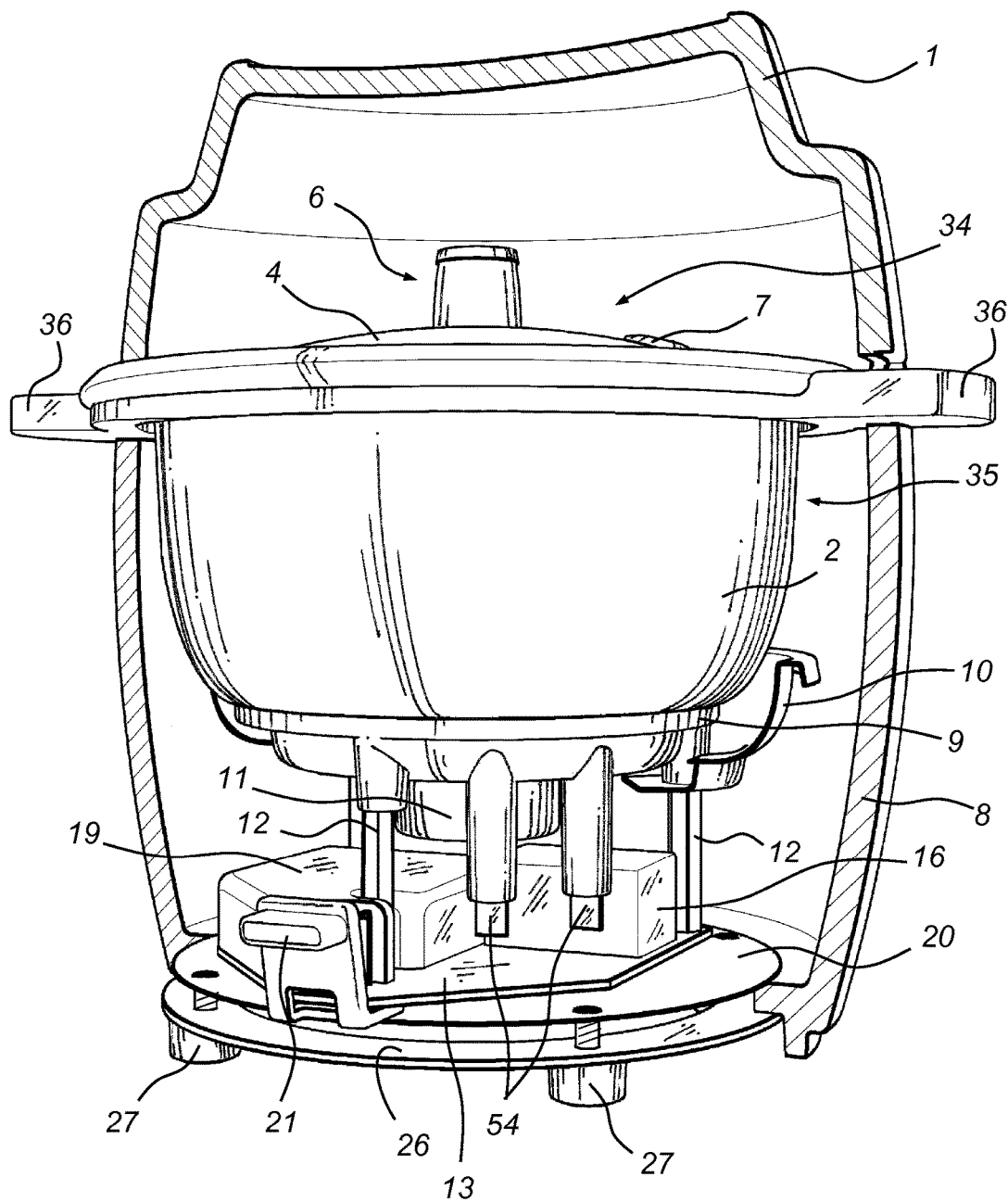
FIG. 5 is a cutaway perspective view of the electric cooking device of FIG. 1.
Figure 6:
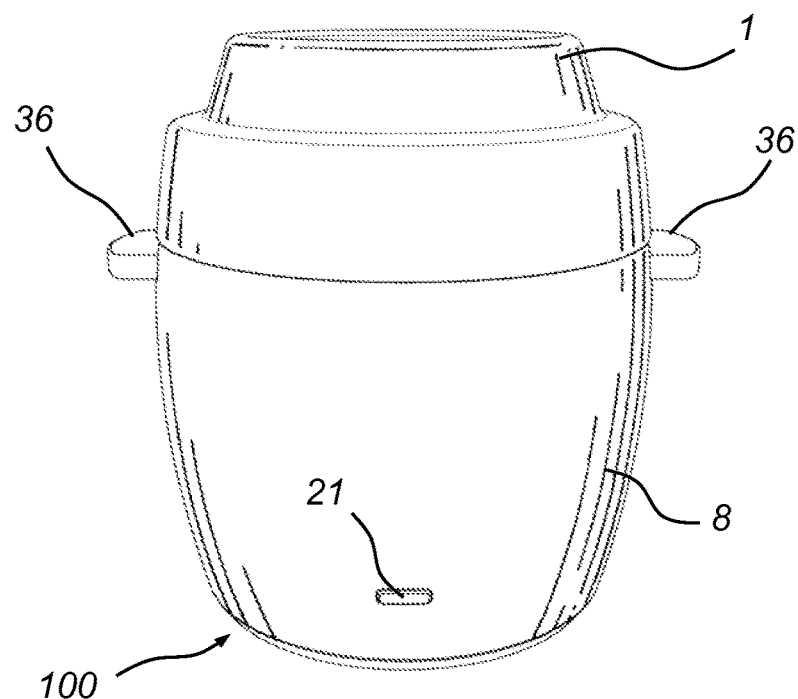
FIG. 6 is one assembled perspective view of the electric cooking device of FIG. 1.
Figure 7:
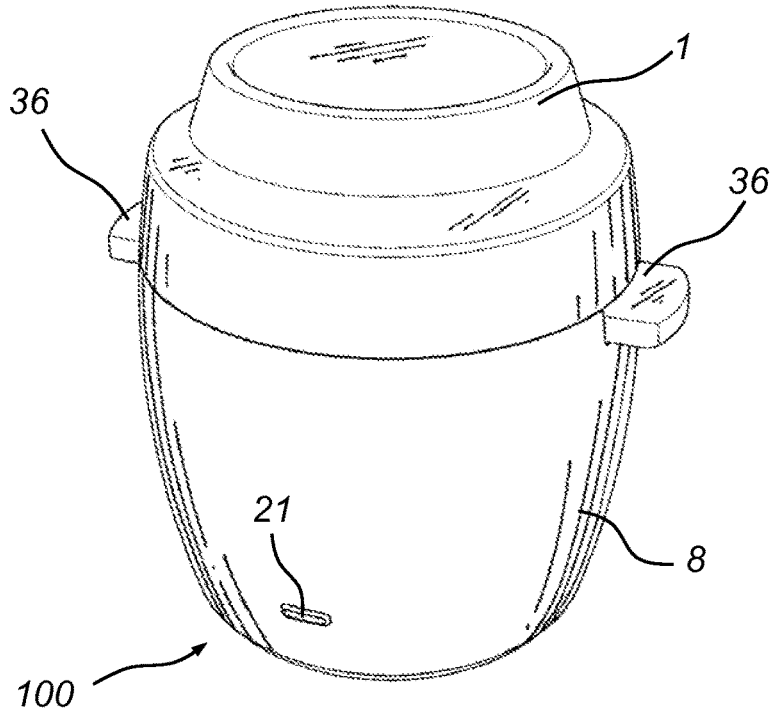
FIG. 7 is another assembled perspective view of the electric cooking device of FIG. 1.
Figure 8:
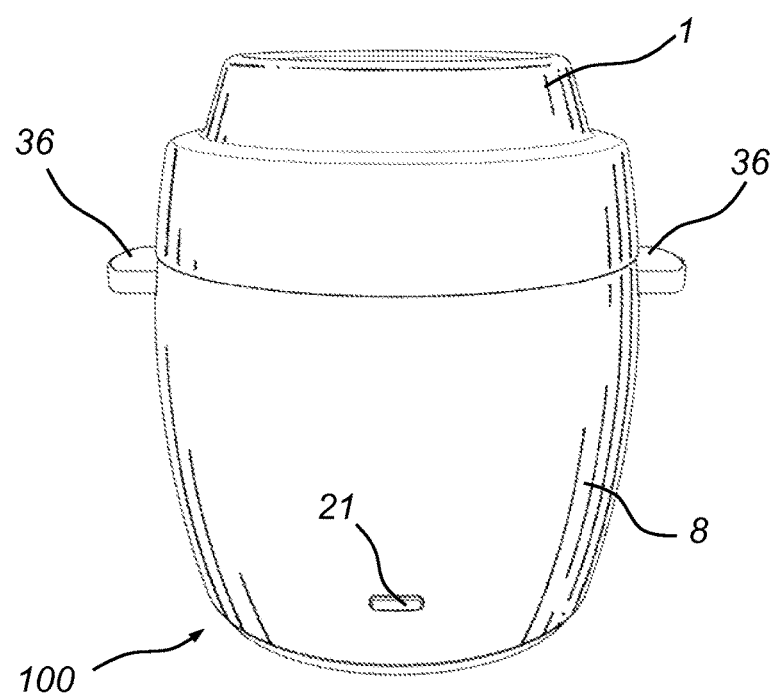
FIG. 8 is yet another assembled perspective view of the electric cooking device of FIG. 1.

With particular reference to FIGS. 1, 3, and 5, it can be seen that, in the illustrative embodiment, the electric cooking device 100 further includes outer shell or housing 8 with an eating dish 1 that attaches to the top portion of the outer shell 8. Advantageously, the eating dish 1 is integrated into the overall design of the electric cooking device 100 so that the user is not required to utilize a separate serving dish. As best illustrated in the sectional view of FIG. 9, the rim of the inverted eating dish 1 rests on the rim of the housing 8 when the eating dish 1 is attached to the top of the electric cooking device 100.

Figure 4:
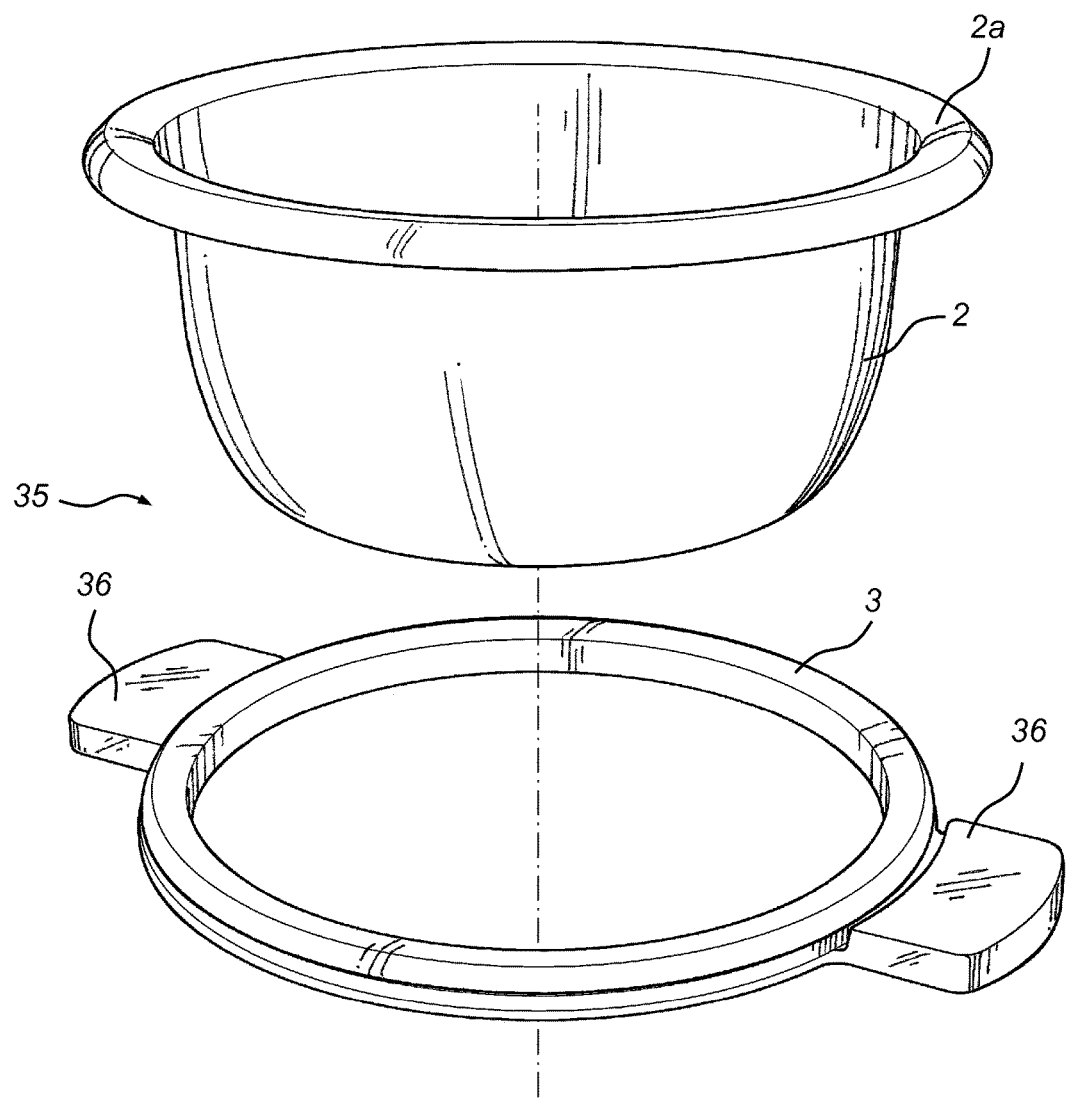
FIG. 4 is an exploded perspective view of a cooking bowl and insulated handle ring portion of the electric cooking device of FIG. 1.

Also, in the illustrated embodiment, it can be seen that the food holding portion of the electric cooking device 100 comprises a cooking bowl assembly 35 (see e.g., FIGS. 1, 4, 5, and 9). As best shown in FIGS. 3 and 4, the cooking bowl assembly 35 includes a cooking bowl body portion 2, a cooking bowl lid 4, and a handle subassembly 3, 36. The cooking bowl lid comprises a lid body portion 4 with a lid rim 5, and a lid knob assembly 6 to facilitate the grasping of the lid 4 by a user thereof. As best shown in FIG. 4, the cooking bowl body portion 2 is configured to engage with the handle subassembly 3, 36. Specifically, the rim 2a of the cooking bowl body portion 2 engages with upwardly protruding annular portion of the thermally insulated handle ring 3. The cooking bowl body portion 2 toollessly engages with the handle ring portion 3 by means of the annular groove in the bottom of the cooking bowl rim 2a resting on the top of the upwardly protruding annular portion of the handle ring portion 3. Turning again to FIG. 4, it can be seen that, in addition to the thermally insulated handle ring portion 3, the handle subassembly 3, 36 also includes handle portions 36 disposed on opposite sides of the handle ring portion 3 for facilitating the grasping of the handle subassembly 3, 36 by a user thereof. In the illustrated embodiment, the electric cooking device 100 comprises an integral eating dish 1 and an integral cooking bowl 2.

Figure 2:
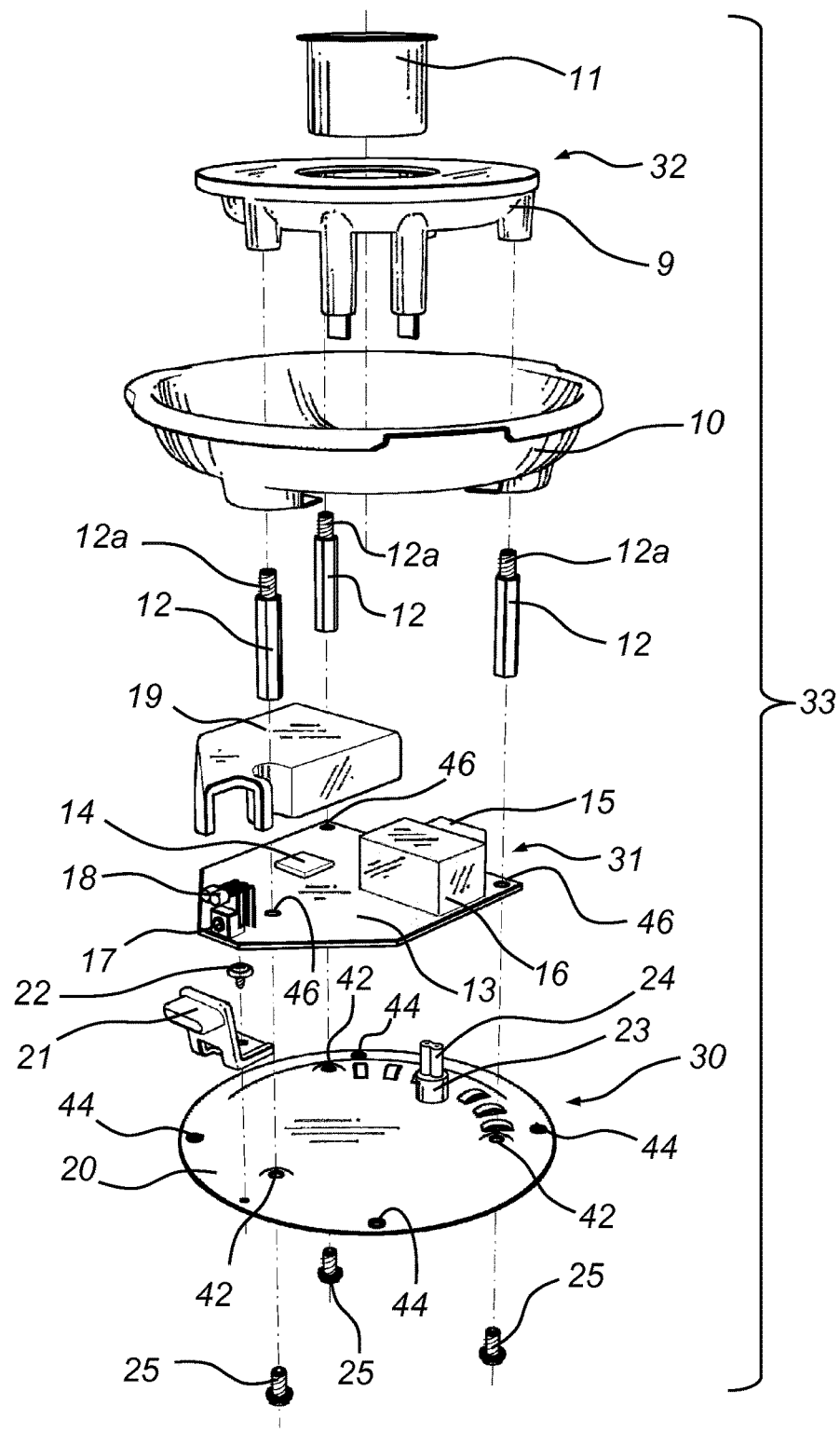
FIG. 2 is an exploded perspective view of a core assembly of the electric cooking device of FIG. 1.

Now, with reference to the exploded views of FIGS. 1 and 2, the assembly method of the electric cooking device 100 will be generally described. As shown in FIG. 1, a complete core assembly 33 may be fastened into the outer shell 8. Advantageously, this assembly approach allows for optional just-in-time, quick turn-around, possibly domestic final assembly of the unit. In one or more embodiments, the outer shell portion 8 is assembled to one or more other components of the electric cooking device 100 by means of clamping without the direct use of fastener devices. For example, turning to FIG. 5, it can be seen that the bottom, inwardly-protruding rim portion of the outer shell portion 8 is clamped between the bottom plate 20 and the base flange 26 of the electric cooking device 100 (i.e., the inwardly-protruding rim portion of the outer shell portion 8 is sandwiched between the bottom plate 20 and the base flange 26).

In an exemplary embodiment, the eating dish 1 may be formed from a ceramic material; the cooking bowl 2 may be formed from sheet metal (e.g., aluminum) with an anti-stick coating; the handle ring 3 may be formed from a natural material, such as wood; the lid body 4 may be formed from glass; the lid rim 5 may be formed from a chrome-plated metal; the lid knob assembly 6 may comprise a plastic knob and counter-part, a screw and washer, and a thermoplastic elastomer (TPE) seal; the venting grommet 7 may be formed from a thermoplastic elastomer (TPE), and the outer shell 8 may be formed from a ceramic material. However, it is to be understood that, in other embodiments, the abovementioned components may be formed using other suitable materials.

The assembly of the constituent components of the core assembly 33 will be described with reference to FIG. 2. As illustrated in this figure, the spring loaded heat sensor assembly 11 is inserted into a central hole in the electric heating element 9. As best shown in FIG. 5, the electric heating element 9 comprises two electrical leads 54 for electrically coupling the electric heating element 9 to the power source 39. The illustrative heat sensor assembly 11 comprises a temperature sensor that detects a temperature of the food holding portion 35 proximate to the food product during the heating thereof. Because the illustrative temperature sensor measures the temperature of the food holding portion 35, and not the food product itself, the actual food product temperature lags behind the temperature of the cooking bowl 2 during the initial temperature ramp-up period of the device 100. Although, once a steady state condition has been reached, (e.g., at about 20% or so of the cooking time duration) the bowl 2 and the food product temperature only vary within a narrow band. In one or more embodiments, the heat sensor assembly 11 is fastened to the electric heating element 9 by utilizing deformable prongs that extend from the spring-loaded heat sensor assembly's outer housing element. Also, in one or more embodiments, the heat sensor assembly 11 may comprise a housing, a spring, and associated sensor wiring in addition to the heat or temperature sensor itself.

With continued reference to FIG. 2, in the illustrated embodiment, it can be seen that each of the three (3) standoffs 12 is provided with a threaded top end 12a having a plurality of male threads disposed thereon. The plurality of male threads on each of the three (3) standoffs 12 is inserted through through-holes in the drip dish 10 into female threaded bosses on the electric heating element 9, effectively trapping the drip dish 10.

Also, as shown in the illustrated embodiment of FIG. 2, the integrated circuit (IC) microchip 14, the power relay 15, the power supply 16, the micro switch 17, and the light emitting diodes (LEDs) 18 may be soldered to the top surface of the printed circuit board (PCB) 13. In FIG. 2, it can be seen that the core assembly 33 of the illustrative electric cooking device 100 also includes a heat shield member 19. The heat shield member 19 is designed to protect one or more electronic components of the control unit 13, 14 from the heat generated by the electric heating element 9 (e.g., protect the integrated circuit (IC) microchip 14). In one or more embodiments, the heat shield member 19 may be fastened to the top surface of the printed circuit board (PCB) 13 by a suitable adhesive or fasteners. In an exemplary embodiment, the heat shield member 19 may be formed from a suitable insulating material, such as injection-molded polystyrene.

Turning again to FIG. 2, it can be seen that, in the illustrated embodiment, the push button 21 is attached to the bottom plate 20 with a fastener 22 (e.g., in the form of a screw or rivet). In addition, the cable strain reliever 23 traps and anchors the power cord 24 to the bottom plate 20. Also, as shown in FIG. 2, the screws 25 are inserted through through-holes 42 in the bottom plate 20 and through-holes 46 in the PCB assembly 31 into the female threaded ends of the standoffs 12, effectively assembling the bottom plate assembly 30 with the PCB assembly 31 and the electric heating element assembly 32.

In an exemplary embodiment, the electric heating element 9 may be formed from cast aluminum; the drip dish 10 may be formed from powder-coated formed sheet metal; the bottom plate 20 may be formed from a plate-formed sheet metal; and the push button 21 may be formed from injection-molded plastic, and may include an integral light pipe for LED light transmission. However, it is to be understood that, in other embodiments, the abovementioned components may be formed using other suitable materials.

The final assembly of the illustrative electric cooking device 100 will be explained with initial reference to FIG. 1. As shown in this figure, the core assembly 33 is top-loaded into the outer shell 8 with the push button 21 being located in a corresponding hole 50 in the outer shell 8. A base flange 26 is then placed from below against the bottom portion of the outer shell 8. Foot fasteners 28 (e.g., shoulder screws with washers) are inserted through through-holes in the foot 27 and through-holes 48 in flange 26, and then into the threaded holes 44 in the bottom plate 20, which traps the inwardly-protruding rim portion of the outer shell 8 between the flange 26 and the bottom plate 20. The stems of the foot fasteners 28 fit snuggly against the inner rim of the hole at the bottom of the outer shell 8, serving as locators to accurately center the core assembly 33 within the outer shell 8. Foot inserts 29 are press-fit into the respective bottom holes of the feet 27, hiding the screws to deter unauthorized disassembly and providing friction against surfaces for non-slip function.

In an exemplary embodiment, the flange 26 may be formed from formed sheet metal or stamped sheet metal; each foot 27 may be formed from injection-molded plastic; and each foot insert 29 may be formed from thermoplastic elastomer (TPE). However, it is to be understood that, in other embodiments, the abovementioned components may be formed using other suitable materials.

Turning to FIG. 3, it can be seen that the illustrative lid body 4 is rimmed with the lid rim 5. The lid knob assembly 6 attaches from the inside and outside to the lid body 4. As shown in FIG. 3, the flexible venting grommet 7 is inserted into a venting hole in the lid body 4.

Figure 9:
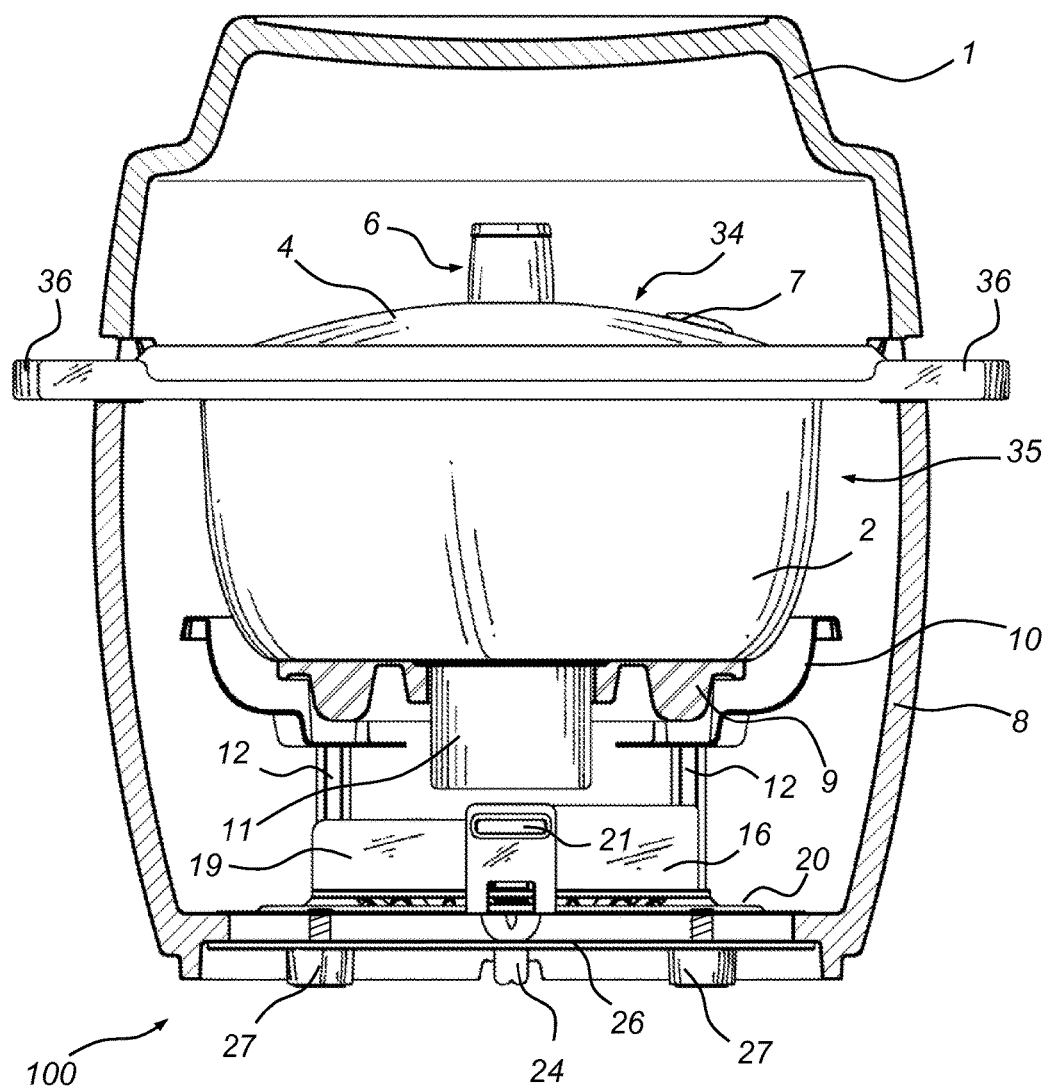
FIG. 9 is a transverse sectional view of the electric cooking device of FIG. 1, which is cut along the cutting-plane line A-A in FIG. 11.
Figure 10:
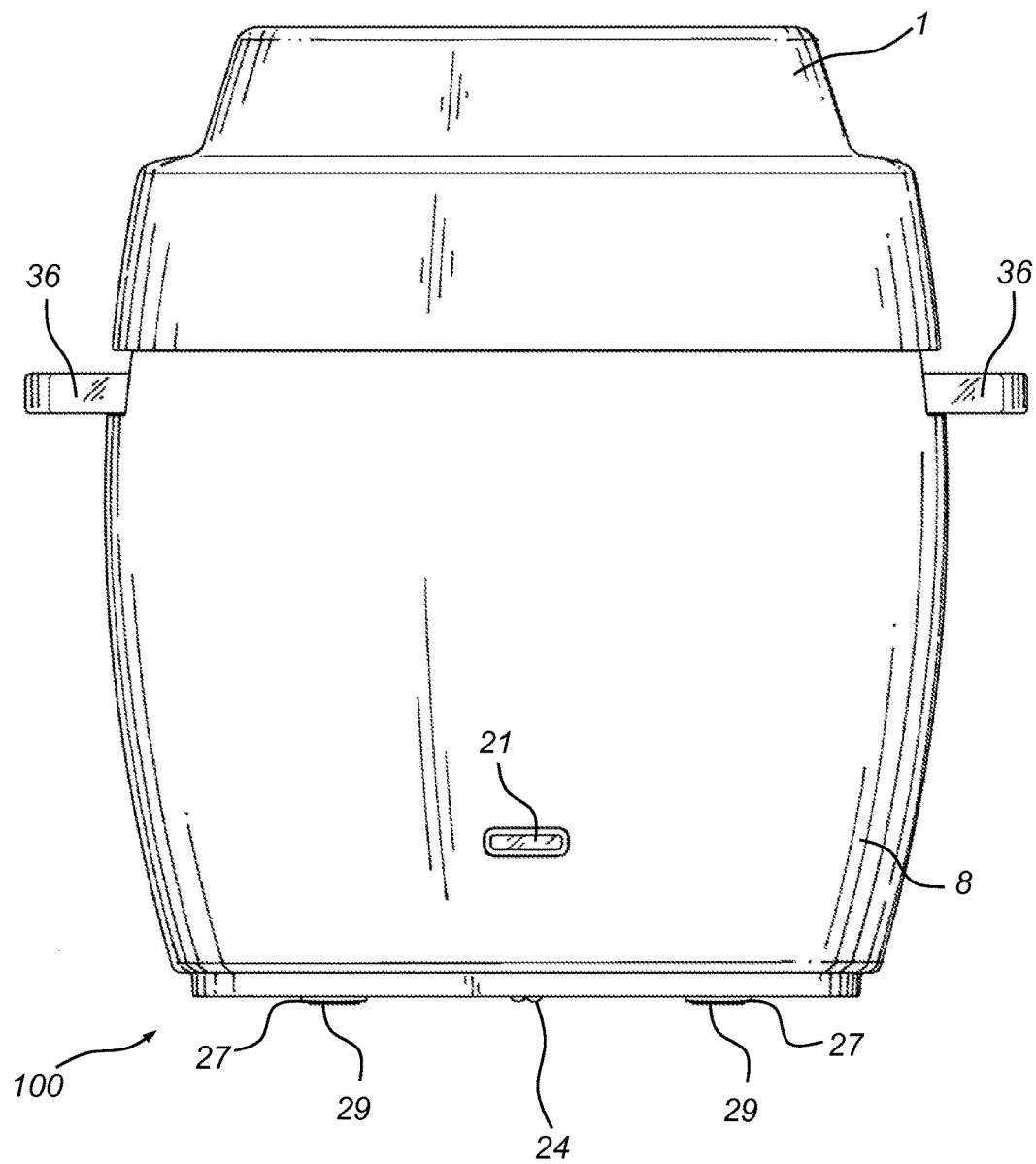
FIG. 10 is a front elevational view of the electric cooking device of FIG. 1.
Figure 11:
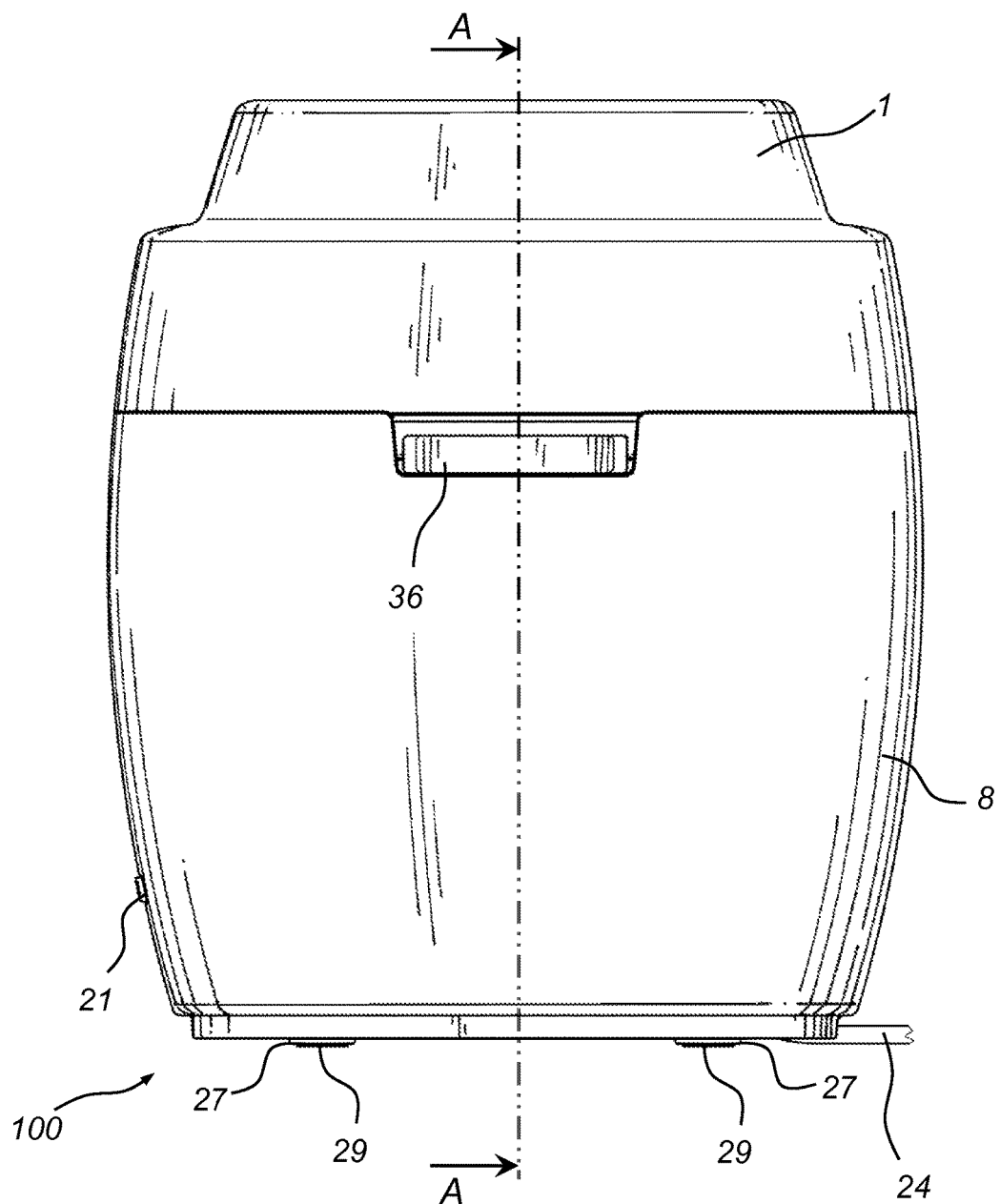
FIG. 11 is a side elevational view of the electric cooking device of FIG. 1.
Figure 12:
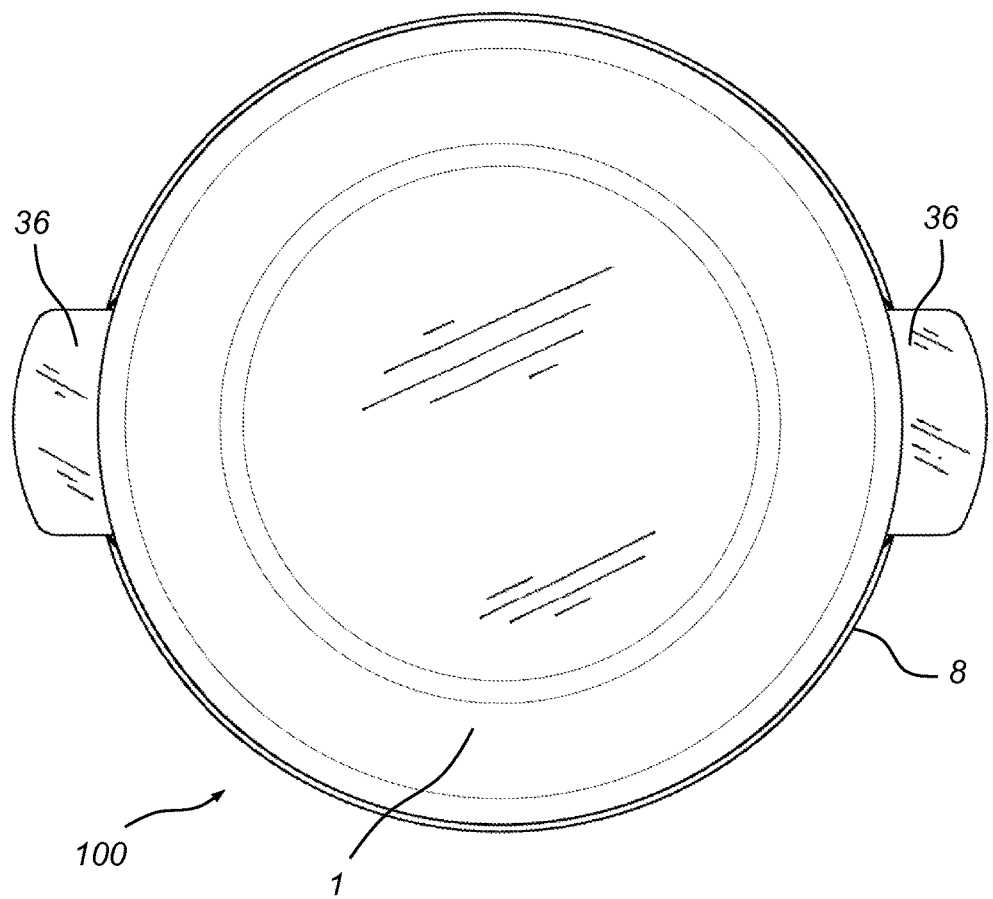
FIG. 12 is a top view of the electric cooking device of FIG. 1.

Next, referring to FIGS. 4 and 5, it can be seen that the handle ring 3 is assembled to the cooking bowl 2 through friction fit without the use of fasteners. As such, the handle ring 3 is toollessly removable from the cooking bowl 2. The bowl assembly 35 is top loaded onto the electric heating element 9 (see e.g., FIG. 5). The lid assembly 34 is top loaded onto the cooking bowl body portion 2 (see e.g., FIG. 3). As illustrated in FIGS. 3, 5, and 9, the eating dish 1 is inserted upside-down from the top onto the outer shell 8. Side-to-side motion of the eating dish 1 is restricted by overlapping lips between the outer shell 8 and the eating dish 1.

Now, with reference to FIGS. 1, 3, 5, and 13-16, an illustrative embodiment of an electric cooking system, which utilizes the electric cooking device 100, will be described in detail. The illustrative electric cooking system generally comprises the electric cooking device 100 described above, and a smart digital device 37 (see FIGS. 13-16) operatively coupled to the control unit 13, 14 of the electric cooking device 100. The smart digital device 37 is specially programmed to allow a user of the system to adjust the cooking settings of the electric cooking device 100. In the illustrative embodiment, in order to greatly streamline the design of the electric cooking device 100, and to make it more user-friendly, the electric cooking device 100 itself does not include a visual display device for displaying cooking settings to the user. Rather, as described in further detail hereinafter, the user can simply use the smart digital device 37 to read and adjust the cooking settings of the electric cooking device 100. Advantageously, because the user is most likely already familiar with the functionality of the smart digital device 37, he or she will not have to endure the laborious task of learning an unfamiliar user interface on the electric cooking device 100.

In the illustrative embodiment, the electric cooking device 100 further comprises a wireless data interface (e.g., a wireless transmission component 38) for wirelessly communicating with the smart digital device 37 (e.g., a cellular phone). In particular, the wireless data interface 38 of the electric cooking device 100 may be configured to wirelessly communicate with the smart digital device 37 by means of a wireless personal area network (e.g., Bluetooth® low energy or Bluetooth® LE). Advantageously, in order to avoid complex and cost prohibitive designs, the electric cooking device 100 does not utilize a plurality of networked computers in order to communicate with the smart digital device 37.

Figure 14:
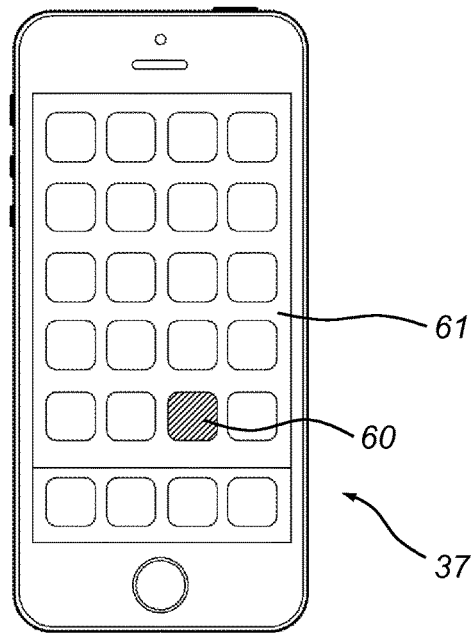
FIG. 14 is a first exemplary screen image of a smart digital device illustrating an application screen, wherein a user is able to select a software application for controlling the operation of the electric cooking device of FIG. 1.
Figure 15:
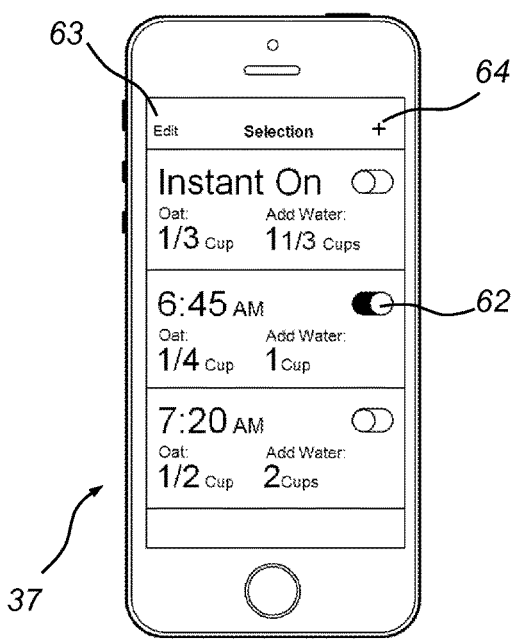
FIG. 15 is a second exemplary screen image of a smart digital device illustrating the functionality of the software application for controlling the operation of the electric cooking device of FIG. 1, wherein the second exemplary screen image depicts user-defined presets that are available to a user using the software application.
Figure 16:
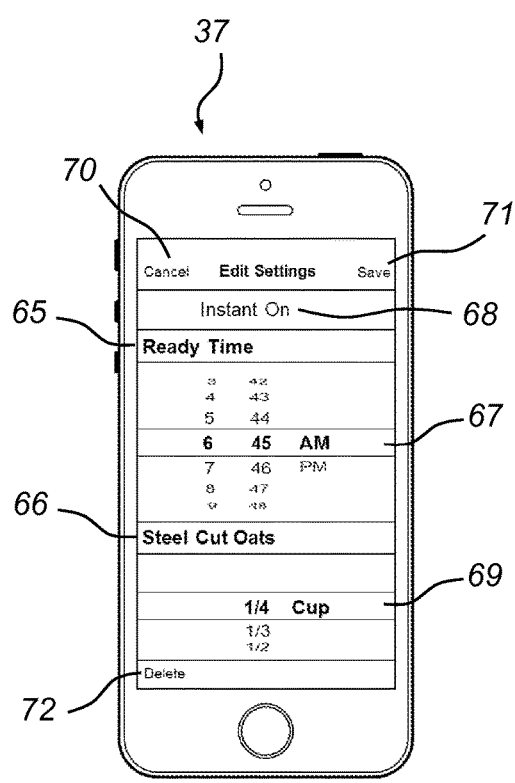
FIG. 16 is a third exemplary screen image of a smart digital device illustrating the functionality of a software application for controlling the operation of the electric cooking device of FIG. 1, wherein the third exemplary screen image depicts cooking device operational settings that are able to be edited by a user using the software application.

The smart digital device 37 may comprise one of: (i) a cellular phone, (ii) a tablet device, (iii) a laptop computing device, (iv) a palmtop computing device, and (v) a desktop computing device. In the illustrative embodiment of FIGS. 13-16, the smart digital device 37 is in the form of a smartphone or a smart cellular phone. As best shown in FIGS. 15 and 16, the illustrative smart digital device 37 comprises a touchscreen user interface that enables a user to manipulate visual objects on the screen of the smart digital device 37 using his or her fingers. The smart digital device 37 is specially programmed so as to enable the user to adjust the cook settings of the electric cooking device 100 using the touchscreen user interface of the smart digital device 37. Advantageously, because all of the cooking settings of the electric cooking device 100 are capable of being adjusted using the touchscreen user interface of the smart digital device 37, there is no need for any display or a complex control panel to be provided on the electric cooking device 100 itself. Rather, the electric cooking device 100 itself only comprises the single user interface push button 21 on the front side thereof (see e.g., FIGS. 2, 3, and 5). To keep the overall design of the electric cooking device 100 simple, the single user interface button 21 only enables basic user interactions, which include initiating an execution of a last-used time and/or temperature parameter of the electric cooking device 100 and termination of an active cooking setting.

Figure 13:
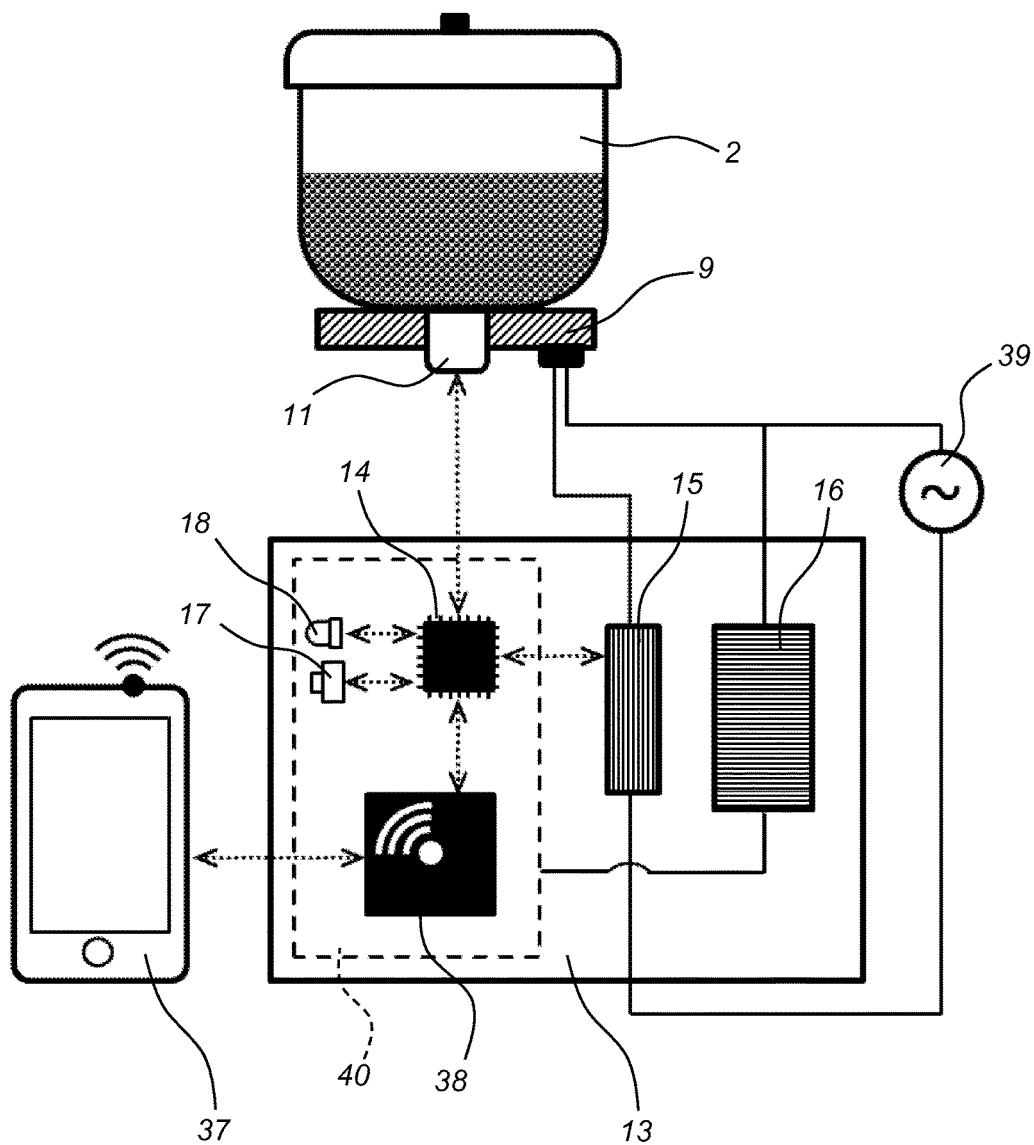
FIG. 13 is an electrical schematic diagram of an electric cooking system, which includes the electric cooking device of FIG. 1.

With reference to FIG. 13, an electrical schematic diagram of the electric cooking system will now be described. As shown in this figure, the primary components on the printed circuit board (PCB) 13 include the integrated circuit (IC) microchip 14, power relay 15, power supply 16, micro switch 17, light-emitting diode (LED) 18, and the wireless transmission component 38.

As depicted in FIG. 13, the electric cooking device 100 may include one or more light-emitting devices (e.g., light-emitting diodes (LEDs) 18) that are configured to provide a visual indicator to the user, which is indicative of one or more operational states of the electric cooking device 100. The one or more light emitting devices (e.g., LEDs 18) may be capable of a plurality of different states of illumination. The plurality of different states of illumination of the light emitting devices 18 may include one or more of: (i) blinking, (ii) pulsing, (iii) continuous activation or deactivation, and (iv) a change in illumination color.

An alternating current (AC) power source 39 powers the electric heating element 9. The alternating current (AC) power source 39 (e.g., 110 or 120 VAC) also supplies AC power to the power supply 16, which transforms the AC input to a low voltage direct-current (DC) output for the electronic section 40 of the PCB 13.

The IC microchip 14 is the "brain" of the unit. The IC microchip 14 takes temperature information from the heat/temperature sensor inside the spring loaded heat sensor assembly 11 (which is pushed up against the bottom of the filled cooking bowl 2), compares the temperature information against programmed target values, and triggers the power relay 15 accordingly to turn off and on the AC power supply to the electric heating element 9. This activity is essentially the function of a proportional-integral-derivative (PID) controller.

The IC microchip 14 also controls the communication between the wireless transmission component 38 and the wireless transmission capable smart device 37. Utilizing this wireless connection, the user activates a software program (i.e., a software application or "app") on the smart device 37 to inform the IC microchip 14 about the preprogrammed set of cooking parameters based on the user's selection of food quantity and the desired ready time. The microchip 14 activates the power supply cycle accordingly.

In addition, the IC microchip 14 also communicates status to the LED 18 and can be triggered by the user to run the last used parameters by pushing the micro switch 17, which is operatively coupled to the push button 21 on the front of the electric cooking device 100. Depressing push button 21 also allows the user to terminate an active cooking cycle.

As such, the control unit of the electric cooking device 100 comprises an electronic controller (e.g., which includes the PCB 13 and the IC microchip 14) that executes a given range of time and temperature parameters for cooking the food product and to process communications with a user of the electric cooking device 100 via the smart device 37. The heat/temperature sensor inside the spring loaded heat sensor assembly 11 detects a temperature of the food holding portion (e.g., cooking bowl assembly 35) proximate to the food product during the heating thereof and outputs a corresponding temperature signal. The electronic controller 13, 14, which is electrically coupled to the heat/temperature sensor of the spring-loaded heat sensor assembly 11, receives the temperature signal from the sensor and regulates the operation of the electric heating element 9 based thereupon. Thus, during the operation of the electric cooking device 100, the electronic controller 13, 14 manages the power supply of the electric cooking device 100, monitors the temperature of the food holding portion 35 by means of the heat/temperature sensor, and monitors cooking time by means of an internal clock.

In one or more embodiments, the control unit of the electric cooking device 100 may comprise one of: (i) a proportional-integral (PI) controller, (ii) a proportional-derivative (PD) controller, and (iii) a proportional-integral-derivative (PID) controller. In these one or more embodiments, the control unit of the electric cooking device 100 provides a control loop feedback mechanism for the monitoring of the temperature and cooking time of the electric cooking device 100. As an alternative to utilizing one of the controllers listed above, the power of the electric cooking device 100 also may be regulated according to a predetermined schedule without actually checking the temperature of the device 100.

Now, turning to FIGS. 14-16, an exemplary software application (app) or program will be explained. In the illustrative embodiment, a smart device 37, such as an iOS® or Android® based cellular phone or tablet is utilized as the main graphical user interface (GUI). Touch sensitive, electronic buttons and scroll wheels on the touchscreen user interface of the smart device 37 activate the functions. Initially, as shown in FIG. 14, the proprietary software application is launched by tapping the associated application button 60 on the application selection home screen 61.

A preset selection view of the exemplary software application on the smart device 37 is illustrated in FIG. 15. As mentioned above, once the software application is launched, a view showing user-defined presets is presented to the user. Tapping a toggle switch 62 will activate the associated setting and communicate the associated cooking parameters to the electric cooking device 100 via its wireless connection. Also, the specially programmed smart device 37 is configured to audibly and/or visually alert the user when the meal is ready by utilizing its user-defined "Notification Center" functionality. Tapping the "Edit" visual object 63 on the touchscreen of the smart device 37 opens the "Edit Settings" view in FIG. 16, so as to allow the user to make modifications to the preset selections. Tapping the "+" visual object 64 on the touchscreen of the smart device 37 opens the "Edit Settings" view in FIG. 16 in order to allow the user to add settings.

An "Edit Settings" view of the exemplary software application on the smart device 37 is shown in FIG. 16. On this screen, the user can set/modify the "Ready Time" 65 and "Steel Cut Oats" 66 quantity. Under the "Ready Time" header, a selection device such as a scroll wheel 67 is used to set the time (i.e., the hours and minutes of the day) at which the user wishes the meal to be ready. The user may also choose "Instant On" 68 to instantaneously activate the electric cooking device 100. Under the "Steel Cut Oats" header on the screen, a selection device such as a scroll wheel 69 is used to set the amount of grains the user wishes to cook. If the user presses the "Cancel" selection 70 on the screen, he or she is returned to the "Preset Selection View" of FIG. 15. Alternatively, if the user presses the "Save" selection 71 on the screen, he or she is returned to the "Preset Selection View" of FIG. 15 and a selection is added with the identified settings from the "Edit" view of FIG. 16. This selection is automatically activated and the toggle switch 62 is presented in the "on" position. If the user presses the "Delete" selection 72 on the screen of FIG. 16, he or she is returned to the "Preset Selection View" of FIG. 15 and the selection with the identified settings is removed from the "Edit" view of FIG. 16. An "Additional Settings" button may be added at the bottom of the screen in FIG. 16 in order to allow the user to further manipulate such items as cooking time and amount of grain.

Now, with initial reference to FIGS. 3-8, an exemplary method of using the electric cooking system, together with its associated functionality, will be described in detail. First of all, the eating dish 1 is removed from the remainder of the electric cooking device 100 by a user. Then, the user removes the lid assembly 34 from the cooking bowl 2 of the electric cooking device 100. After which, the user fills the cooking bowl 2 with dry steel cut oats and cold/room temperature water. In one or more embodiments, a measuring scoop may be supplied with the electric cooking system. Also, in one or more exemplary embodiments, the oat-to-water ratio is approximately one-to-three (1:3). The illustrative electric cooking device 100 may accommodate ¼, ⅓, or ½ cup of steel cut oats along with ¾ cups, 1 cup, or 1½ cups of water, respectively. Although, in other embodiments, the electric cooking device 100 accommodates larger cup sizes of steel cut oats (i.e., greater than ½ cup) and larger proportionate cup sizes of water (i.e., greater than 1½ cups). The porridge yield is approximately equivalent to the oats plus water amount. In other words, ¼ cup of dry oats will yield about a cup of oatmeal, which can be considered one serving. The illustrative electric cooking device 100 may yield a maximum of two servings. The filling of the electric cooking device 100 may be done ahead of time (e.g., the evening before to enjoy hot breakfast cereal the next morning). The soaking of the oats is beneficial to the consistency of the resulting porridge. In an exemplary embodiment, a maximum soaking time (e.g., 12 hours) is recommended to prevent undesirable results or possibly even unhealthy conditions, which may be revealed by subsequent testing. As explained above, the illustrative electric cooking device 100 also has an 'instant on' setting for just-in-time cooking. The experienced user of the device 100 can choose to over/under dose the oat and/or water content in an effort to modify the consistency of the cooked porridge.

In one or more exemplary embodiments, a ¼ cup of dry oats may be heated at a sub-boil simmer temperature using the electric cooking device 100 for a cooking time period of approximately 40 minutes, a ⅓ cup of dry oats may be heated at a sub-boil simmer temperature using the electric cooking device 100 for a cooking time period of approximately 45 minutes, and a ½ cup of dry oats may be heated at a sub-boil simmer temperature using the electric cooking device 100 for a cooking time period of approximately 50 minutes. It is to be understood that these cooking times are merely exemplary in nature, and that other suitable cooking times may be used. For example, if the oats are presoaked for several hours prior to being cooked in electric cooking device 100, shorter cooking times may be used.

Also, in one or more exemplary embodiments, a quantity of steel cut oats may be cooked at a simmer temperature for a predetermined amount of time (e.g., for one of the cooking time periods discussed above) without reaching a boiling temperature for an extended period of time (e.g., without exceeding the boiling temperature for a time duration of 3 minutes or less). For example, the oat/water slurry may go over the boiling temperature as it overshoots the target near-boil temperature (for a short time, the electric heating plate of the cooking device 100 keeps supplying energy even after it is shut off). In an exemplary cooking procedure carried out using the electric cooking device 100, temperature spikes occur at the beginning of the cooking process as the oat/water slurry temperature catches up with the (measured) pot temperature. It is to be understood that, in other embodiments, the boiling temperature may be exceeded for a time duration of greater than 3 minutes. For example, at the beginning of the cooking process, when there is more water available to dilute the starch content of the steel cut oats, good results may still be obtained when the oat/water slurry is cooked at a temperature exceeding the boiling temperature for a time period of greater than 3 minutes.

After the cooking bowl 2 of the electric cooking device 100 is filled with a mixture of steel cut oats and water, the lid assembly 34 is replaced (i.e., placed back on the top of the cooking bowl 2). Then, the power cord 24 of the device 100 (e.g., a 2-pin power cord) is plugged into an electrical power receptacle or outlet, and the device is activated. In an exemplary embodiment, the electric cooking device 100 has at least two (2) modes of operation, which include: (i) using the software application on the smart device 37 to control the electric cooking device 100, and (ii) using the push button 21 on the front of the cooker to control the device 100.

First of all, the manner in which the electric cooking device 100 is controlled by the software application on the smart device 37 will be explained. Advantageously, the software application will offer a simple, easy to use interface with the cooker 100. As discussed above, in the illustrative embodiment, the smart digital device 37 wirelessly communicates with the wireless data interface 38 of the electric cooking device 100 by means of a wireless personal area network (e.g., Bluetooth® low energy or Bluetooth® LE). Thus, the software application on the smart device 37 is used to set the ready time and the amount of oats that are going to be cooked. In order to activate the cooker, the user simply taps the desired setting/preset on the smart device 37 (refer to the screen images of FIGS. 14, 15, 16, and the detailed description of the user interface (UI) provided above).

In one or more embodiments, indicator lights (e.g., LEDs 18) on the cooker button 21 may indicate a successful linkage between the cooker 100 and the smart device 37. Also, in addition to, or in lieu of indicator lights, audible sounds (e.g., as generated by one or more audio output devices) may indicate a successful linkage between the cooker 100 and the smart device 37. For example, various states of lighting and/or audio feedback, such as beeps, may be used to indicate a current status of the cooker 100. Several illustrative examples of such visual indicators (i.e., lighting) include: (i) a light flashing to indicate that the cooker 100 is connected to the smart device 37, (ii) a slow pulsing light (e.g., using a heartbeat rhythm) to indicate that the cooker 100 is activated and is in a "standby" mode for cooking at a later time, (iii) a continuously illuminated light (i.e., steady "on" light) to indicate that the cooker 100 is currently cooking the oats, and (iv) a double-flashing light to indicate that the cooker 100 is in a "keep warm" mode.

In one or more exemplary embodiments, the standard light color for the one or more visual indicators (e.g., LEDs 18) is white. Other colors, such as green and red, may be used to further differentiate cooker 100 status. The cooker 100 may have the cooking time for the three amounts of oats and water described above pre-programmed therein. As such, the cooker 100 may automatically start the cooking process in time to be ready at the selected time. If "instant on" is selected by the user, the cooker 100 may start the cooking process immediately. In addition, in one or more embodiments, a deeper level interface option may be provided within the software application so that the user is able to modify the preset cooking time (within limits). Advantageously, the deeper level interface option would allow the user to further fine-tune the consistency of the finished porridge. The device 37, which executes the software application, may automatically alert the user when the porridge is ready. Advantageously, the wireless interface described above obviates the need for any physical or hard-wired connection between the cooker 100 and the device 37.

Next, the second mode of activation of the electric cooking device 100, which utilizes the push button 21 on the front of the electric cooking device 100, will be described. In an exemplary embodiment, in accordance with the second mode of activation, the cooker 100 memorizes the last used cooking instructions. A user activates this setting by pushing the push button 21. This allows the user to bypass the interaction with the smart device 37 altogether if he or she is following a consistent ritual such as eating the same amount of hot breakfast cereal at the same time every morning. The initial steps of removing the eating dish 1, removing the lid assembly 34 of the cooking bowl 2, filling the cooking bowl 2 with dry steel cut oats and water, and replacing the lid assembly 34 (as described above) are initially performed by the user, and then, the user depresses the push button 21 on the front of the electric cooking device 100 to activate the cooker 100. Lights (e.g., LEDs 18) on the push button 21 may communicate the cooker status as described above. Depressing push button 21 also allows the user to terminate an active cooking cycle.

After the electric cooking device 100 is activated using one of the exemplary modes of activation described above, the user then waits for a "ready" indication from the cooker 100. Once the ready time is reached, the porridge is ready to eat. The cooker 100 may switch to a lower "keep warm" temperature for a short amount of time after it is indicated to be ready (e.g., for a time duration of 10 minutes). During that time, the porridge consistency may slightly 'thicken' but it still remains pleasant to the user. The cooker 100 may then turn itself off since exposure to long "keep warm" time periods (such as is the case with rice cookers) will turn the porridge into a dense, unappetizing mass.

Next, the porridge (i.e., the cooked steel cut oats) is ready to be served. Using the electric cooking device 100 described herein, at least two serving options are available to the user. As one serving alternative, the user may remove the lid assembly 34 of the cooking bowl 2 and use a spatula-style scoop, which may be supplied with the cooker 100, to transfer the porridge to either the supplied eating dish 1 or any other preferred dish. The tip corners of the spatula-style scoop may be shaped/rounded to match the bottom inside corner shape of the cooking bowl 2. Such a design of the spatula-style scoop will make removal of all the porridge easier. As another serving alternative, the entire cooking bowl/lid/handle ring assembly 34, 35 may be lifted out of the cooker 100 and placed into the supplied eating dish 1. The stay-cool handle ring 3 with handle portions 36 provides sufficient grip areas for two hands of the user. The handles 36 fit into notches 51 of similar size on the top rim of the eating dish 1 (see FIG. 1) to prevent excessive motion of the inserted cooking pot assembly as the dish may be transported. Advantageously, the eating dish 1 of the electric cooking device 100 protects the user from a hot cooking pan and provides an eating-out-of-a-dish experience although the user eats directly out of the cooking pot. As illustrated in FIG. 1, when the cooking bowl/lid/handle ring assembly 34, 35 is engaged with the rest of the electric cooking device 100, the handles 36 of the handle ring 3 fit into notches 52 on the top rim of the cooker outer shell 8.

After the user has consumed the porridge, the next step is to clean the bowl or dish that was used for eating the porridge. Advantageously, if the user uses the second serving alternative described above, there is only one dish to clean (i.e., the cooking bowl 2) unless the user accidentally soils the eating dish 1. The cooking bowl 2 of the cooker 100 may go into the dishwasher. The handle ring 3 may or may not be dishwasher safe. If the handle ring 3 is not dishwasher safe, it will be easily removable from the cooking bowl 2. There will only be a friction or light form fit between the handle ring 3 and the cooking bowl 2. In one exemplary embodiment, snap-fit details may be incorporated into the engagement between the handle ring 3 and the cooking bowl 2. In an alternative embodiment, the cooker 100 may comprise a design where dishwasher safe handles are permanently fastened to the cooking bowl 2.

Finally, after the bowl or dish that was used for eating the porridge is cleaned, the last step is to reassemble the components of the electric cooking device 100. Namely, the cooking bowl 2, handle ring 3, and lid assembly 34 are assembled and top-loaded onto the electrical heating element 9. The handle portions 36 (i.e., grip sections) of the handle ring 3 fit into the similarly sized notches 52 on the top edge of the outer shell or enclosure 8 (see FIGS. 1 and 3). The eating dish 1 is flipped upside down and inserted onto the top of the cooker 100 (see FIGS. 9 and 10). An overlapping edge detail on the eating dish 1 and the outer shell 8 keep the eating dish 1 centered on the top of the electric cooking device 100.

In one or more embodiments, the electric cooking device 100 does not comprise a pressure cooking device containing many complex components, and the electric cooking device 100 does not comprise a sous-vide style cooker or a fryer appliance. Also, in one or more embodiments, the electric cooking device 100 does not comprise any moving components, such as pulverizing blade, that contact the food product (e.g., the steel cut oats), and the electric cooking device 100 does not comprise a temperature sensor that actually contacts the food product. In addition, in one or more embodiments, the electric cooking device 100 does not include a steam generator that is coupled to a fluidic reservoir.

It is readily apparent that the aforedescribed electric cooking device 100 and the electric cooking system including the same offer numerous advantages. First, the electric cooking device 100 is capable of efficiently heating a food product (e.g., steel cut oats) at a simmer temperature without requiring laborious cooking tasks to be performed by a user thereof. Secondly, the electric cooking system described herein employs a user interface of a separate, external electronic device for adjusting the cooking settings of the electric cooking device 100 so as to obviate the need for complex user interface on the electric cooking device 100 itself. Finally, the method of using the electric cooking system, which is described herein, includes the controlled cooking of the grains at a simmer temperature so as to prevent the undesirable formation of a skin on the cooked grains.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An electric cooking device comprising, in combination:
   a food holding portion, said food holding portion configured to receive a food product for cooking, said food holding portion comprising a cooking bowl assembly, said cooking bowl assembly comprising a cooking bowl body portion, a cooking bowl lid, and at least one handle portion;
   a housing with at least one retention element for preventing movement of said at least one handle portion of said cooking bowl assembly relative to said housing;
   an electric heating device thermally coupled to said food holding portion, said electric heating device configured to heat said food product disposed in said food holding portion, said electric heating device contacting said food holding portion, said electric heating device defining a central aperture, and said electric heating device comprising a plurality of female threaded bosses;
   a control unit operatively coupled to said electric heating device, said control unit configured to control said electric heating device such that said food product is heated for a predetermined amount of time, said control unit including an electronic controller and a data interface, said data interface configured to operatively couple said electronic controller to a remote digital device, said electronic controller configured to receive cooking settings for said electric cooking device from said remote digital device via said data interface, process said cooking settings from said remote digital device, and control said electric heating device based upon said cooking settings from said remote digital device;
   a drip dish member having a peripheral rim and a plurality of holes disposed through said drip dish member, said drip dish member disposed between said food holding portion and said control unit, said peripheral rim of said drip dish member circumscribing said electric heating device, and said electric heating device disposed between said food holding portion and said drip dish member;
   a plurality of fastener devices, each of said plurality of fastener devices comprising male threads, said male threads on each of said plurality of fastener devices configured to be inserted through said holes in said drip dish member and into said female threaded bosses of said electric heating device so as to trap said drip dish member;
   a temperature sensor configured to detect a temperature of said food holding portion proximate to said food product during the heating thereof, said temperature sensor being operatively coupled to said electronic controller, and said temperature sensor being disposed in said central aperture of said electric heating device; and
   a heat shield member disposed over a portion of said control unit, said heat shield member being disposed between said drip dish member and said control unit, and said heat shield member configured to protect one or more electronic components of said control unit from heat generated by said electric heating device;

wherein said electric cooking device does not comprise any moving components that contact said food product.

2. The electric cooking device according to claim 1, wherein said electronic controller is further configured to manage a power supply of said electric cooking device, monitor said temperature of said food holding portion by means of said temperature sensor, and monitor cooking time by an internal clock.

3. The electric cooking device according to claim 2, wherein said control unit further comprises one of: (i) a proportional-integral (PI) controller, (ii) a proportional-derivative (PD) controller, and (iii) a proportional-integral-derivative (PID) controller, said control unit configured to provide a control loop feedback mechanism for the monitoring of said temperature and the monitoring of said cooking time.

4. The electric cooking device according to claim 1, further comprising an eating dish integrated into said electric cooking device, said eating dish configured to engage with said cooking bowl assembly of said electric cooking device, and said eating dish comprising at least one handle notch for receiving said at least one handle portion of said cooking bowl assembly in said at least one handle notch.

5. The electric cooking device according to claim 4, wherein said at least one handle portion of said cooking bowl assembly is part of a handle subassembly, said handle subassembly comprising a thermally insulated handle ring portion, said cooking bowl body portion configured to toollessly engage said thermally insulated handle ring portion.

6. The electric cooking device according to claim 1, further comprising a bottom plate member and a base flange member, said housing of said electric cooking device configured to be assembled to said bottom plate member and said base flange member of said electric cooking device by means of clamping without a use of fastener devices.

7. The electric cooking device according to claim 1, further comprising one or more light emitting devices configured to provide a visual indicator to said user indicative of at least one of the following operational states of said electric cooking device: (i) said electric cooking device being connected to said remote digital device, (ii) said electric cooking device being activated and in a standby mode for cooking at a later time, (iii) said electric cooking device currently cooking said food product, and (iv) said electric cooking device currently keeping said food product warm after the cooking thereof.

8. The electric cooking device according to claim 7, wherein said one or more light emitting devices comprise one or more light-emitting diodes (LEDs).

9. An electric cooking system comprising, in combination:
an electric cooking device, which includes:
a food holding portion, said food holding portion configured to receive a food product for cooking;
an electric heating device thermally coupled to said food holding portion, said electric heating device configured to heat said food product disposed in said food holding portion, said electric heating device contacting said food holding portion, said electric heating device defining a central aperture, and said electric heating device comprising a plurality of female threaded bosses;

a control unit operatively coupled to said electric heating device, said control unit configured to control said electric heating device such that said food product is heated for a predetermined amount of time, said control unit including an electronic controller and a data interface, said electronic controller comprising one of: (i) a proportional-integral (PI) controller, (ii) a proportional-derivative (PD) controller, and (iii) a proportional-integral-derivative (PID) controller, said electronic controller configured to provide a control loop feedback mechanism for the monitoring of said temperature and the monitoring of said cooking time;

a drip dish member having a plurality of holes disposed through said drip dish member, said drip dish member disposed between said food holding portion and said control unit, and said electric heating device disposed between said food holding portion and said drip dish member;

a plurality of fastener devices, each of said plurality of fastener devices comprising male threads, said male threads on each of said plurality of fastener devices configured to be inserted through said holes in said drip dish member and into said female threaded bosses of said electric heating device so as to trap said drip dish member;

a temperature sensor configured to detect a temperature of said food holding portion proximate to said food product during the heating thereof, said temperature sensor being operatively coupled to said electronic controller, and said temperature sensor being disposed in said central aperture of said electric heating device; and a heat shield member disposed over a portion of said control unit, said heat shield member being disposed between said drip dish member and said control unit, and said heat shield member configured to protect one or more electronic components of said control unit from heat generated by said electric heating device;

wherein said electric cooking device does not include a visual display device for displaying cooking settings to a user, and wherein said electric cooking device does not comprise any moving components that contact said food product; and a remote digital device operatively coupled to said control unit of said electric cooking device, said remote digital device being programmed to allow said user to adjust said cooking settings of said electric cooking device;

wherein said data interface of said electric cooking device is configured to operatively couple said electronic controller to said remote digital device, said electronic controller of said electric cooking device configured to receive said cooking settings for said electric cooking device from said remote digital device via said data interface, process said cooking settings from said remote digital device, and control said electric heating device based upon said cooking settings from said remote digital device.

10. The electric cooking system according to claim 9, wherein said data interface of said electric cooking device is in the form of a wireless data interface for wirelessly communicating with said remote digital device.

11. The electric cooking system according to claim 10, wherein said wireless data interface of said electric cooking device is configured to wirelessly communicate with said remote digital device.

12. The electric cooking system according to claim 9, wherein said remote digital device comprises one of: (i) a cellular phone, (ii) a tablet device, (iii) a laptop computing device, (iv) a palmtop computing device, and (v) a desktop computing device.

13. The electric cooking system according to claim 9, wherein said remote digital device comprises a touchscreen user interface, and said remote digital device is programmed so as to enable said user to adjust said cooking settings of said electric cooking device using said touchscreen user interface.

14. The electric cooking system according to claim 9, wherein said electric cooking device comprises a single user interface button on an outside thereof, said single user interface button only enabling basic user interactions, which include initiating an execution of a last-used time or temperature parameter and termination of an ongoing cooking cycle.

15. The electric cooking system according to claim 9, wherein said electric cooking device does not utilize a plurality of networked computers in order to communicate with said remote digital device.

16. The electric cooking device according to claim 2, further comprising a power relay operatively coupled to said power supply of said electric cooking device and said electronic controller, said electronic controller being configured to activate and deactivate power to said electric heating device of said electric cooking device by controlling said power supply of said electric cooking device via said power relay.

17. The electric cooking device according to claim 1, wherein said at least one retention element of said housing is a notch in said housing for receiving said at least one handle portion of said cooking bowl assembly in said notch.

* * * * *